US005728362A

United States Patent [19]
Greuter et al.

[11] Patent Number: 5,728,362
[45] Date of Patent: Mar. 17, 1998

[54] METHOD OF PRODUCING A MIXED METAL OXIDE POWDER AND MIXED METAL OXIDE POWDER PRODUCED ACCORDING TO THE METHOD

[75] Inventors: Felix Greuter, Rütihof; Daniel Werder, Oberrohrdorf, both of Switzerland

[73] Assignee: Asea Brown Boveri AG, Baden, Switzerland

[21] Appl. No.: 510,653

[22] Filed: Aug. 3, 1995

[30] Foreign Application Priority Data

Sep. 22, 1994 [EP] European Pat. Off. ............ 94114917

[51] Int. Cl.$^6$ .................. C01G 29/00; C01G 51/00; C01G 37/00; C01G 45/00
[52] U.S. Cl. .................. 423/593; 423/594; 423/595; 423/599
[58] Field of Search ................... 423/593, 594, 423/595, 599

[56] References Cited

U.S. PATENT DOCUMENTS

| | | | |
|---|---|---|---|
| 2,155,119 | 4/1939 | Ebner | 423/DIG. 2 |
| 4,023,961 | 5/1977 | Douglas et al. | 423/593 |
| 4,540,971 | 9/1985 | Kanai et al. | 252/518 |
| 4,668,299 | 5/1987 | Nanao et al. | 423/593 |
| 4,853,199 | 8/1989 | Inoue et al. | 423/593 |
| 4,999,182 | 3/1991 | Baumard et al. | 423/608 |
| 5,061,682 | 10/1991 | Aksay et al. | 423/592 |
| 5,075,090 | 12/1991 | Lewis et al. | 423/600 |
| 5,358,695 | 10/1994 | Helble et al. | 423/593 |
| 5,395,821 | 3/1995 | Kroeger et al. | 423/593 |

FOREIGN PATENT DOCUMENTS

| | | |
|---|---|---|
| 336787 | 10/1989 | European Pat. Off. . |
| 0366313 | 5/1990 | European Pat. Off. . |
| 3916643 | 1/1991 | Germany . |

Primary Examiner—Steven Bos
Attorney, Agent, or Firm—Burns, Doane, Swecker & Mathis, L.L.P.

[57] ABSTRACT

A mixed metal oxide powder of nominal composition $M_x M'_{x'} \ldots, O_z$, wherein M, M'. . . . are metal elements and each of x, x', . . . z is greater than zero, is produced by forming an aqueous solution comprising metal salts such that the solution contains at least some of the metal elements of the mixed metal oxide in a desired ratio and comprises at least one oxidizing agent such as a nitrate of one of the metals, and at least one reducing agent such as an organic acid. The oxidizing and the reducing agent as well as the ratio of the former to the latter are chosen such that the thus-formed tuned solution undergoes an exothermic reaction occurs at a desired rate and at a desired small temperature range. Aerosol-droplets of essentially equal dimensions are generated from the tuned solution and are sprayed into a heated gas jet. The temperature of the gas jet and the residential time of the droplets in the gas jet are chosen such that the exothermic reaction and that the material of the mixed metal oxide powder is formed into an essentially amorphous oxide phase. Mixed metal oxide powder manufactured according to this method can be used in a sintering process for forming any high performance ceramics, in particular a metal oxide varistor with an excellent homogeneity, a high breakdown voltage and a low protection factor.

16 Claims, 3 Drawing Sheets

5,728,362

METHOD OF PRODUCING A MIXED METAL OXIDE POWDER AND MIXED METAL OXIDE POWDER PRODUCED ACCORDING TO THE METHOD

BACKGROUND OF THE INVENTION

1. Field of the invention

The invention relates to a method of producing a mixed metal oxide powder of nominal composition $M_xM'_{x'}\ldots O_z$, wherein M, M', ... are metal elements and each of x, x', ..., z is greater than zero, in which an aqueous solution is formed comprising metal salts such that the solution contains at least some of the metal elements of the mixed metal oxide essentially in the atomic ratio x:x': ... such that at least one of the salts is an oxidizing agent with respect to at least one of the other salts acting as a reducing agent, and such that the oxidizing agent and the reducing agent, as well as the ratio of the former to the latter are chosen such that an exothermic reaction occurs at a desired rate and at a desired small temperature range, in which said aqueous solution or a dispersion of an oxide of at least one of said metal elements in said aqueous solution is sprayed to form particles and in which said particles are heated to a reaction temperature such that said exothermic reaction occurs and said mixed metal oxide powder is formed from the particles. The method can be used for producing any multicomponent powder, in particular powders in which the mol ratio of the components does not correspond to a distinct crystalline phase. The invention also relates to a mixed metal oxide produced according to the afore-mentioned method.

2. Technological background

A method of producing a mixed metal oxide powder of nominal composition $M_xM'_{x'}\ldots O_z$ wherein M, M', ... are metal elements and each of x, x', ..., z is greater than zero, have already been described in EP 0 366 313 B1. The powder produced according to the known method is used for making superconductors, spinels or ferrites. In a first step of this method an aqueous solution is formed comprising metal salts such that the solution contains the metal elements of the mixed metal oxide essentially in the atomic ratio x:x': ... At least one of the salts is a nitrate and acts as an oxidizing agent with respect to at least one of the other salts which is an acetate and acts as a reducing agent. In a second step the aqueous solution is spray-dried. The result of the spray-drying is a powder with small particles in which the salts are intimately mixed with each other. In the resulting mixture the oxidizing agent and the reducing agent, as well as the ratio of the former to the latter are chosen such that an exothermic reaction may occur at a desired rate and at a desired small temperature range, for instance 270° C. In a third step the powder is put into ceramic boats and placed under flowing $O_2$ into a furnace that is kept at about 400° C. The exothermic reaction occurs and yields a mixed oxide powder. In a fourth step the mixed oxide powder is then heated to 900° C. and is maintained at that temperature for 10 minutes under flowing $O_2$, followed by a slow cool to room temperature, also under flowing $O_2$. The resulting powder is a material of the mixed metal oxide which may then be used for forming said superconductors.

The method is time consuming since during its execution a lot of different steps have to be performed. Furthermore, the temperature distribution during the execution of the method is not homogeneous and it is not easy to control the exothermic reaction since the powder to be reacted is put in boats and it must be kept for a comparatively long time in a furnace.

A modified pyrolytical process for the preparation of ceramics, in particular varistor ceramics on the basis of a mixed metal oxide is disclosed in DE 39 16 643 C1 and in V. Hilarius et al. "Pyrolytic Powder Processing for Varistor Materials", Third Euro-Ceramics V.1, pp.297-301, edited by P. Duran and J. F. Fernandez, Faenza Editrice Iberica, S. L. 1993. In this process mixed aqueous solutions of metal nitrates of the desired stoichiometry of the ceramic and organic additives are sprayed in the form of small droplets into the flame of a burner driven with fuel gas and air and arranged at the top side of a cylindrical reaction chamber heated up to a temperature typically exceeding 1000° C. Hereby a chemical reaction occurs as follows:

The resulting metal oxides are cooled down behind the reaction chamber by air quenching and by the use of a heat exchanger. The metal oxides form a powder of agglomerated, spherically shaped particles having crystalline structure.

Since the reaction temperature in the individual droplets or in the resulting dry particles, is typically between 1000° C. and 2000° C., the resulting powder particles have a structure with different crystalline phases in which the metal oxides are not mixed very homogeneously. Furthermore, because of the high reaction temperature volatile components of the reacting particles may evaporate.

SUMMARY OF THE INVENTION

Accordingly one object of the invention, is to provide a method in which, in a time-saving manner, an essentially single phase mixed metal oxide powder is produced and at the same time to provide a mixed metal oxide powder which can be used for manufacturing articles with eminently good properties.

The method according to the invention is notable for the fact that it is based on a simple, well controlled process and that is has a comparitively low cost/performance ratio. Since the exothermic reaction is performed not only at a desired rate and at a desired small temperature range but also in a well controlled manner with respect to the temperature of a gas jet and the time of residence of droplets in the gas jet, the resulting mixed metal oxide powder has an essentially amorphous, single phase structure in which the metal additives are distributed homogeneously and in which their concentration ratios can be varied over a wide range. Such a powder can be used for manufacturing articles, in particular varistors, with eminently good properties.

BRIEF DESCRIPTION OF THE DRAWING

A more complete appreciation of the invention and many of the intended advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
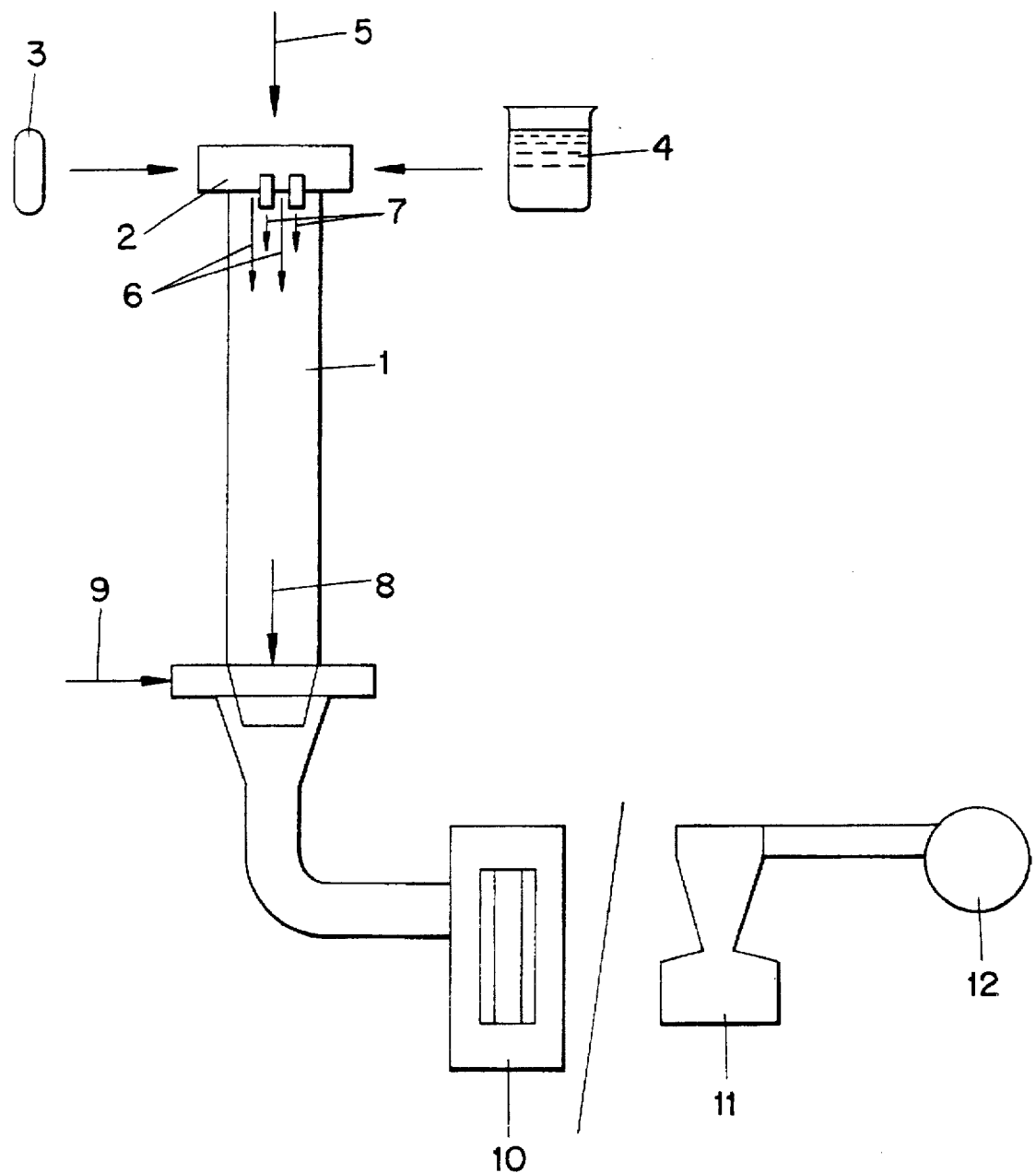
FIG. 1 illustrates in a schematic manner equipment for performing the method according to the invention, FIG. 2 gives differential scanning calorimetry and differential thermogravimetry results for a spray dried powder produced from an aqueous solution tuned according to the invention, FIG. 3 gives differential scanning calorimetry and differential thermogravimetry results for a spray dried powder produced from a solution tuned according to prior art.

Referring now to the drawing in FIG. 1 there is shown equipment for manufacturing a mixed metal oxide powder of nominal composition $M_xM'_{x'}\ldots, O_z$, wherein M, M', .. are metal elements and each of x, x',..., z is greater than zero. The equipment comprises a vertically arranged tubular steel reaction chamber 1 having a tube length of approximately 1500 mm and a tube diameter of approximately 150 mm. The upper end of the reaction chamber 1 carries an aerosol generator 2. The aerosol generator 2 has two inputs one of which is connected to a compressed gas source 3, in particular to a compressed air source, and the other to a vessel 4 filled with an aqueous solution. 5 denotes compressed hot gas, in particular compressed hot air, which passes the reaction chamber 1 from the upper to the lower end as a heated gas jet 6 having a temperature of up to 600° C. 7 denotes aerosol-droplets of essentially equal dimensions, which are formed in the aerosol generator 2 and which are sprayed into the heated gas jet 6. In the heated gas jet 6 the aerosol-droplets 7 are dried and a material-charged heated gas jet 8 is formed, which at the lower end of the reaction chamber 1 is quenched by means of a cooled gas jet 9, in particular a cooled air jet. The material from the cooled gas jet can be recovered by means of a filter 10, in particular a base of polyester coated with PTFE, or by means of a cyclone 11 and a vacuum device 12.

The aqueous solution comprises metal salts such that the solution contains at least some of the metal elements of the mixed metal oxide essentially in the atomic ratio $x:x':\ldots$, and comprises at least one oxidizing agent and at least one reducing agent. The oxidizing agent and the reducing agent, as well as the ratio of the former to the latter are chosen such that an exothermic reaction occurs at a desired rate and at a desired small temperature range (i.e., the ingredients are selected to form a tuned solution).

A typical tuned solution for the production of a mixed metal oxide powder used in a sintering process for forming a metal oxide varistor may comprise Bi, Co, Cr, Mn and Ni as metal elements. Additionally, it may comprise Sb and Si as water-soluble salts or it may form a dispersion with $Sb_2O_3$ and $SiO_2$ as finely divided oxides. The tuned solution or the tuned dispersion contains a minimum of acids and bases and typically has a pH>1. The solution or dispersion comprises nitrates as oxidizing agents, fuels on the basis of organic acids and/or salts of said acids, in particular acetates, tartrates and/or citrates, as reducing agents and ammonium hydroxide and/or one or more ammonium salts. The tuned solution or the tuned dispersion has a neutral, weak acid or weak basic character. As an example, a tuned solution may comprise:

0.050–0.070 mol $Bi(NO_3)_3 \cdot 5H_2O$
0.015–0.020 mol $Co(NO_3)_2 \cdot 6H_2O$
0.005–0.015 mol $Mn(NO_3)_2 \cdot 4H_2O$
0.005–0.010 mol $Cr(NO_3)_3 \cdot 9H_2O$
0.015–0.025 mol $Ni(NO_3)_2 \cdot 6H_2O$
0.050–0.100 mol $NH_4NO_3$ appr. 0.01 mol $HNO_3$ (65%)
0.100–0.200 mol $NH_4OH$ (25%)
0.200–0.600 mol acetic acid
0.050–0.100 mol citric acid
0.080–0.120 mol Sb acetate The pH value of this solution is approximately 4. Such a solution does not cause any corrosion or impurity problems and can be handled without any difficulty.

Besides organic acids, ions of metal elements, ammonium and nitrate ions the solution may comprise small additions of dispersed $SiO_2$. Organic acids on the one side and nitrate ions on the other side have essentially a mol ratio 2:1 for the afore-described example. The mol ratio $NH_4^+:NO_3^-$ is approximately 1:1.

Figure 2:
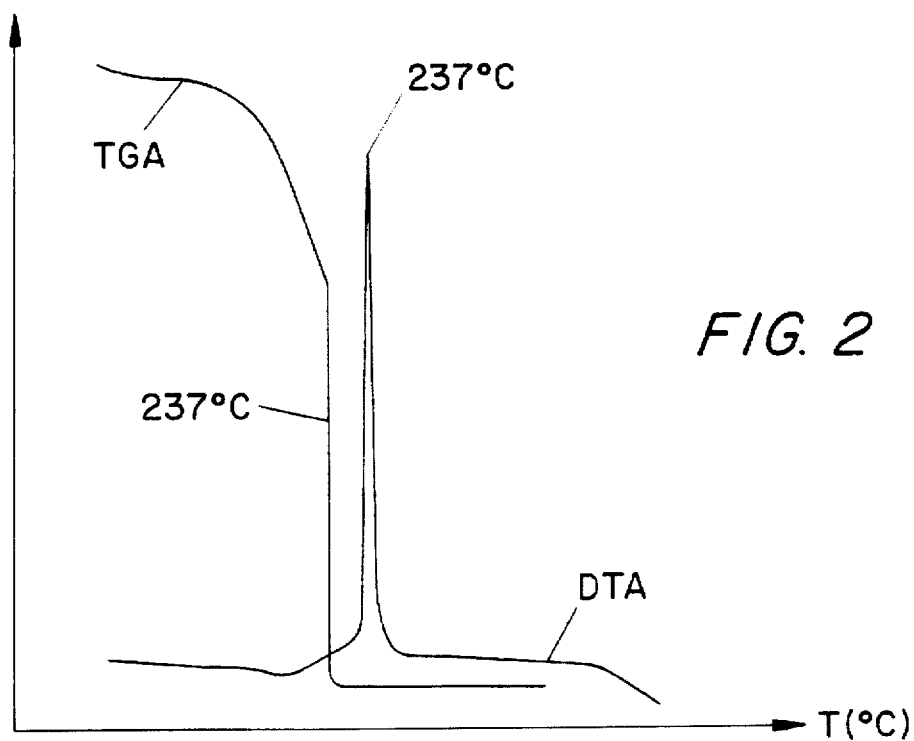

A part of the tuned solution was spray dried in a commercially available spray drier. The resulting powder was subjected to a differential thermocalometry analysis (DTA) and to a thermogravimetry analysis (TGA). The resulting DTA- and TGA-spectra can be taken from FIG. 2. In a small temperature range between 220° and 260° C. with maximum at 237° C. the powder will show a strong exothermic reaction, which can be a self-propagating combustion. This combustion occurs in one single step at a well defined specific temperature. The chemical energy released in this combustion leads to a decomposition of the salts to the mixed metal oxide powder (calcination). The presence of $NH_4^+$ and $NO_3^-$ 303 in the solution or of $NH_4NO_3$ in the spray dried powder is essential to trigger the exothermic reaction at a low temperature of approximately 240° C., in analogy to the well-known violent reaction of ammonium nitrate upon fast heating, which releases oxygen and energy:

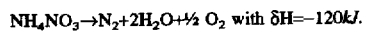
$NH_4NO_3 \rightarrow N_2 + 2H_2O + \frac{1}{2} O_2$ with $\delta H = -120 kJ$.

Figure 4:
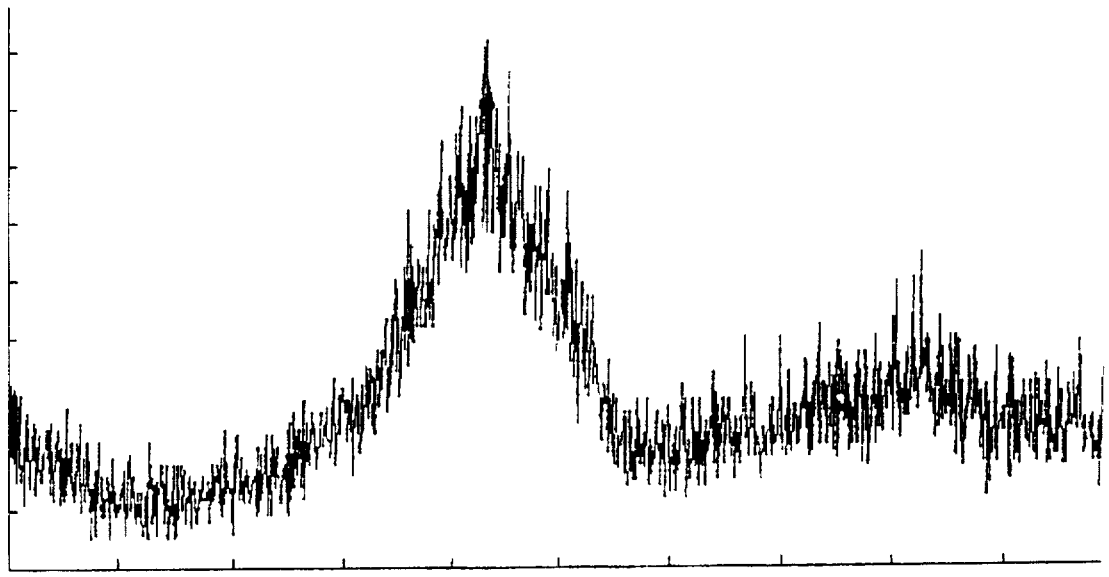
FIG. 4 shows an X-ray diffraction spectrum of a mixed metal oxide powder manufactured from the solution mentioned in FIG. 2.

If the combustion process is properly tuned, the energy input can be controlled such that it is sufficient to convert the salts to their oxides but is not high enough to form crystallographic phases among some of the additives present. This would be a loss in chemical homogeneity. As one can see from the X-ray diffraction spectrum according to FIG. 4, the mixed metal oxide powder resulting in the DTA analysis at a temperature of about 240° C. is essentially amorphous. The resulting powder contains all additives homogeneously mixed on the atomic level. The conversion to the oxide form is complete without any significant weight loss upon further heating.

In a solution which has the same stoichiometry as the afore-mentioned solution with respect to the metal elements but in which the organic acids on the one side and ammonium and nitrate ions on the other side have a mol ratio other than 2:1 (untuned solution), the combustion will proceed through a series of individual steps occurring at different temperatures.

Figure 3:
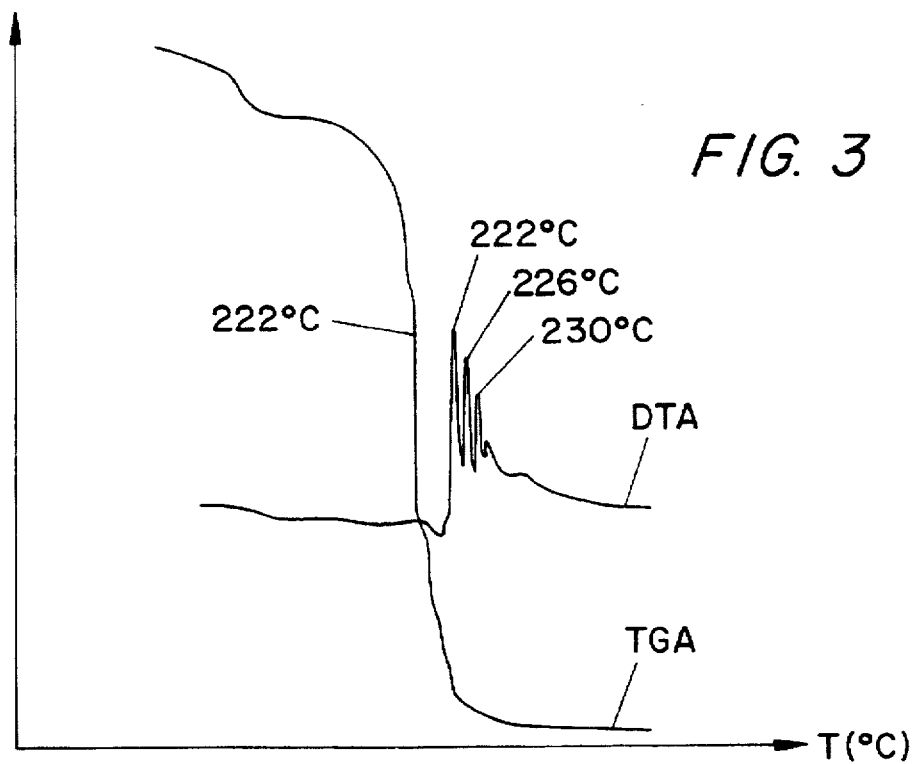
Figure 5:
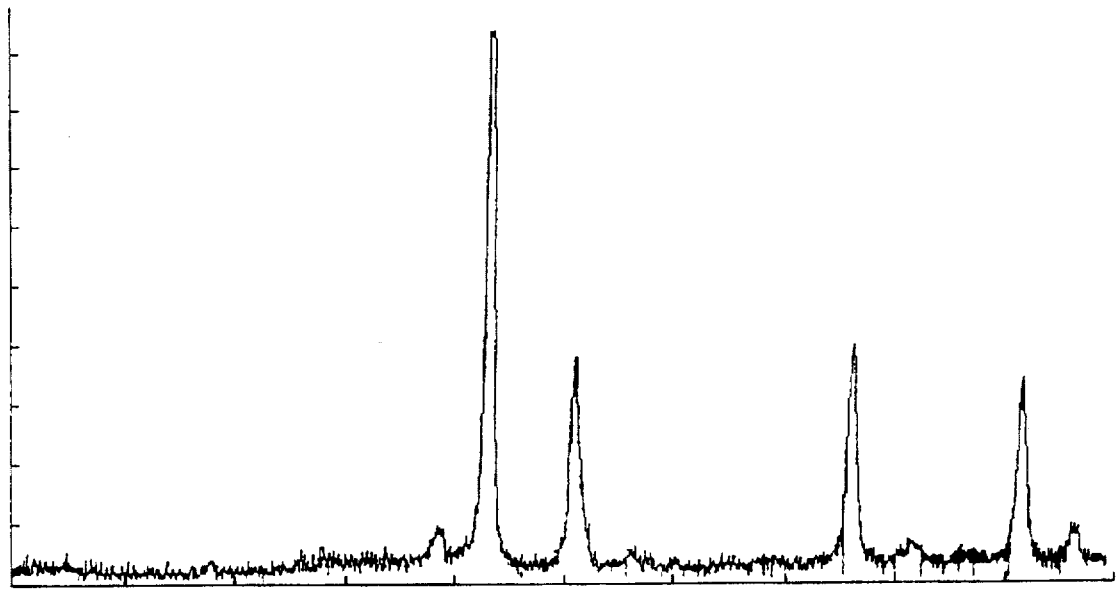
FIG. 5 shows an X-ray diffraction spectrum of a mixed metal oxide powder manufactured from the solution mentioned in FIG. 3.

A combustion of an untuned solution with a mol ratio 1:1 is illustrated in FIG. 3. The powder resulting from this combustion comprises several crystalline phases which are generated at different combustion temperatures, in particular 222, 226 and 230° C. At each temperature parts of the additives react with each other and are converted to a mixed metal oxide consisting of one of said crystalline phases. The mixed metal oxide powder generated in such a process has a rather undefined and inhomogeneous mixture of single and mixed oxides. This can be taken from its X-ray spectrum shown in FIG. 5 in which the different sharp peaks represent different crystalline phases of a single metal oxide or of a mixed metal oxide of the manufactured powder.

The tuned aqueous solution or the tuned dispersion is conducted from the vessel 4 to the aerosol generator 2 in which by means of compressed air from source 3 are generated aerosol-droplets 7 of essentially equal dimensions. The droplets 7 are sprayed into the heated gas jet 6 in which the droplets are dried. The temperature of the gas jet 6 and the time of residence of droplets 7 in the gas jet are chosen such that the exothermic reaction occurs and that the material of the mixed metal oxide powder is formed in an essentially amorphous phase. The material-charged gas jet 8 is quenched after the formation of the amorphous phase and the mixed metal oxide powder is recovered from the cooled gas jet.

The average size of the droplets 7 may be chosen such that the material of the mixed metal oxide powder is a powder formed from massive particles. The diameter of the droplets 7 may then be some µm, for instance 1 or 2 µm. The average size of the droplets 7 may also be chosen such that the material of the mixed metal oxide powder is formed from hollow spheres having a comparatively small wall thickness. The diameter of the droplets 7 may then be about 10 µm. The resulting hollow spheres are very fragile and have a wall thickness of about 1 µm. The hollow spheres can be be milled down very easily to particles having an average size comparable with the wall thickness of the hollow spheres.

Typical operation conditions for a laboratory type spray reactor are:

solution feed rate: 1.5–2.5 l/h temp. of compressed hot air at hot air blowers: 600°–700° C.

flow rate: 40–80 m$^3$/h inlet temperature after spray nozzle: 500°–600° C.

outlet temperature: 80°–150° C.

quench air: 200°–400 m$^3$/h 0.02–0.08 mol of the manufactured mixed metal oxide powder is mixed with about 0.92–0.98 mol ZnO powder. At a temperature of about 1100° C. the mixture is sintered to a varistor body.

A varistor having such a varistor body has a very homogeneous structure with small grains. Compared with a varistor having the same chemical composition and sintered at the same conditions but using a mixed metal oxide powder manufactured according to the prior art, such a varistor has a higher breakdown voltage $U_B$ (25 until 50%) and a lower protection factor $U_P/U_B$ (3 until 5% with $U_P$=residual voltage).

LIST OF DESIGNATIONS 1 reaction chamber
2 areosol generator
3 compressed gas source
4 vessel
5 compressed hot air
6 heated gas jet
7 aerosol-droplets
8 material-charged heated gas jet
9 cooled gas jet
10 filter
11 cyclone
12 vacuum device

We claim:

1. A method of producing a mixed metal oxide powder of nominal composition $M_xM'_{x'}$ . . . , $O_z$, wherein M, M', . . . are metal elements and each of x, x', . . . , z is greater than zero, in which an aqueous solution is formed comprising metal salts such that the solution contains at least some of the metal elements of the mixed metal oxide essentially in the atomic ratio x:x': . . . , and the aqueous solution further comprising at least one oxidizing agent and at least one reducing agent, in which said oxidizing agent and said reducing agent, as well as the ratio of the former to the latter are chosen such that an exothermic reaction occurs, in which said aqueous solution or a dispersion of an oxide of at least one of said metal elements in said aqueous solution is sprayed to form particles, and in which said particles are heated to a reaction temperature in a temperature range of 220° to 260° C. such that said exothermic reaction occurs and said mixed metal oxide powder is formed from the particles, the particles being generated in the form aerosol-droplets of essentially equal dimensions, the droplets being sprayed into a heated gas jet, and the temperature of the heated gas jet and the time of residence of the droplets in the heated gas jet being chosen such that said exothermic reaction occurs, the material of said mixed metal oxide powder being formed in an essentially amorphous phase.

2. The method of claim 1, wherein the gas jet becomes a material-charged gas jet which is quenched to form a cooled gas jet after the formation of the amorphous phase and said mixed metal oxide powder is recovered from the cooled gas jet.

3. The method of claim 2, wherein the heated gas jet comprises hot air and immediately after the inlet of the droplets the hot air has a temperature of up to 600° C.

4. The method of claim 1, wherein the average size of the droplets is chosen such that the material of said mixed metal oxide powder is a powder formed from massive particles.

5. The method of claim 1, wherein the average size of the droplets is chosen such that the material of the mixed metal oxide powder is formed from hollow spheres having a small wall thickness and said hollow spheres are milled such that the particles of the resulting mixed metal oxide powder have an average size comparable with the wall thickness of said hollow spheres.

6. The method of claim 1, wherein said aqueous solution comprises at least organic acids, ions of said metal elements, ammonium and nitrate ions.

7. The method of claim 6, wherein the aqueous solution includes a solution having an acid PH, said organic acids and said nitrate ions being present in such a ratio that the reaction proceeds in one step.

8. The method of claim 6, wherein said aqueous solution comprises said ammonium and nitrate ions essentially in the mol ratio 1:1 and upon heating said droplets in said heated gas jet said ammonium and said nitrate ions react with each other in said temperature range between 220° and 260° C. and trigger said exothermic reaction.

9. The method of claim 6, wherein said aqueous solution with neutral, acid or basic character is formed by adding ammonium hydroxide to said aqueous solution.

10. The method of claim 1, further comprising adding $Sb_2O_3$, $SiO_2$ or mixture thereof to said aqueous solution.

11. The method of claim 1, wherein a varistor is prepared by sintering a mixture of said mixed metal oxide powder and ZnO powder.

12. The method of claim 1, wherein said exothermic reaction occurs in a manner such that the mixed metal oxide powder consists essentially of a homogenous single phase having an amorphous microstructure.

13. A mixed metal oxide powder produced according to claim 1, wherein the particles of said powder essentially consist of an amorphous, single phase material.

14. The mixed metal oxide powder of claim 13, wherein said mixed metal oxide powder is an additive used in a sintering process for forming a metal oxide varistor and comprises at least Bi, Co, Cr, Mn and Ni as metal elements.

15. The mixed metal oxide of claim 14, wherein said mixed metal oxide powder additionally comprises at least Sb, Si or mixtures thereof.

16. The mixed metal oxide powder of claim 13, comprising a varistor wherein the metal elements consist of Sb, Si, Bi, Co, Cr, Mn, Ni and mixtures thereof.

* * * * *